United States Patent [19]
Stulpin

[11] Patent Number: 5,982,968
[45] Date of Patent: Nov. 9, 1999

[54] STRESS CONCENTRATIONS IN AN OPTICAL FIBER RIBBON TO FACILITATE SEPARATION OF RIBBON MATRIX MATERIAL

[75] Inventor: Robert W. Stulpin, Catawba, N.C.

[73] Assignee: Alcatel NA Cable System, Inc., Claremont, N.C.

[21] Appl. No.: 09/020,530

[22] Filed: Feb. 9, 1998

Related U.S. Application Data

[62] Division of application No. 08/660,960, Jun. 12, 1996, Pat. No. 5,717,805.

[51] Int. Cl.⁶ ........................................................ G02B 6/44
[52] U.S. Cl. ........................ 385/114; 385/100; 385/112; 385/114; 385/113; 264/1.24; 264/1.25; 264/1.28; 425/385; 425/394
[58] Field of Search ................................ 385/100–114; 264/1.24, 1.25, 1.28; 425/383, 385, 394

[56] References Cited

U.S. PATENT DOCUMENTS

| | | | |
|---|---|---|---|
| 3,219,752 | 11/1965 | Harris | 174/117 |
| 4,308,421 | 12/1981 | Bogese, II | 174/32 |
| 4,488,125 | 12/1984 | Gentry et al. | 333/1 |
| 4,628,599 | 12/1986 | Bermier, Jr. et al. | 29/857 |
| 4,640,569 | 2/1987 | Dola et al. | 339/143 R |
| 4,642,480 | 2/1987 | Hughes et al. | 307/147 |
| 4,663,098 | 5/1987 | Gilliam et al. | 264/104 |
| 4,680,423 | 7/1987 | Bennett et al. | 174/36 |
| 4,720,165 | 1/1988 | Shuichiro et al. | 350/96.24 |
| 4,815,814 | 3/1989 | Ulijasz | 350/96.23 |
| 4,913,515 | 4/1990 | Braunmiller et al. | 350/96.23 |
| 5,442,722 | 8/1995 | DeCarlo | 385/114 |
| 5,460,682 | 10/1995 | Beasley et al. | 156/344 |
| 5,524,164 | 6/1996 | Hattori et al. | 385/114 |
| 5,574,817 | 11/1996 | Henson et al. | 385/114 |
| 5,717,805 | 2/1998 | Stulpin | 385/114 |

FOREIGN PATENT DOCUMENTS

| | | |
|---|---|---|
| 0321787 | 6/1989 | European Pat. Off. . |
| 8901208 | 5/1989 | Germany . |
| 8906993 | 9/1989 | Germany . |
| MI932152 | 4/1995 | Italy . |
| 63-200109 | 8/1988 | Japan . |
| 63-28814 | 8/1988 | Japan . |
| 1137208 | 5/1989 | Japan . |
| 1137209 | 5/1989 | Japan . |
| 1138516 | 5/1989 | Japan . |
| 1138517 | 5/1989 | Japan . |
| 1138518 | 5/1989 | Japan . |
| 1138519 | 5/1989 | Japan . |
| 246411 | 2/1990 | Japan . |
| 256510 | 2/1990 | Japan . |

OTHER PUBLICATIONS

Meeting the Demands of the Local Loop with Improved Ribbon Fiber Midspan Access, Beasley et al., Sumitomo Electric Fiber Optics Corp., pp. 401–408, *NFOEC 1994 Proceedings*, 1994.

*Primary Examiner*—Phan T. H. Palmer
*Attorney, Agent, or Firm*—Ware, Fressola, Van Der Sluys & Adolphson LLP

[57] ABSTRACT

In an optical fiber ribbon including a plurality of optical fibers arranged in a common plane in generally side-by-side relationship and surrounded by a layer of matrix material, at least one stress concentration is formed in the matrix material surrounding the optical fiber ribbon. The stress concentration extends along at least a portion of the ribbon parallel to a longitudinal axis of the ribbon and concentrates stress applied to the ribbon such that the matrix material easily separates at the stress concentration. Each stress concentration may be formed directly in the matrix material during its application on the optical fibers, or an abrasive surface may be applied to the fiber to form the stress concentration. Stress concentrations may formed on at least one extreme edge of the optical fiber ribbon such that the entire matrix material may be easily removed from a section of optical fiber ribbon at a desired ribbon access location. Alternatively, stress concentrations may be formed on at least one of the major surfaces of the optical fiber ribbon at designated locations where it is desired for the optical fiber ribbon to be separated into smaller groups or sub-ribbons.

7 Claims, 3 Drawing Sheets

STRESS CONCENTRATIONS IN AN OPTICAL FIBER RIBBON TO FACILITATE SEPARATION OF RIBBON MATRIX MATERIAL

CROSS REFERENCE TO RELATED APPLICATIONS

This is a divisional application of patent application Ser. No. 08/660,960 now is U.S. Pat. No. 5,717,805, filed Jun. 12, 1996. The subject matter of that application is hereby incorporated in full by reference.

TECHNICAL FIELD

The present invention relates to an optical fiber ribbon and more particularly, to an optical fiber ribbon having stress concentrations in the optical fiber ribbon matrix material for facilitating removal of the matrix material.

BACKGROUND OF THE INVENTION

An optical fiber ribbon is a well known structure which includes a plurality of individual optical fibers which are held in spaced positions parallel to each other in a common plane. For example, a typical optical fiber ribbon may include twelve (12) individual optical fiber waveguides aligned relative to one another in a common plane with all of the optical fiber waveguides being imbedded in a single or multi-layer coating of a matrix material, such as a polyurethane acrylate resin.

Each of the individual optical fibers may be provided with a layer of a colorant material to uniquely identify each of the optical fiber waveguides within the optical fiber ribbon. The individual optical fibers may be of various types, including single coated or multicoated optical fibers.

An advantage of using an optical fiber ribbon of the above-described type is that the optical fiber ribbon provides a modular design which simplifies the construction, installation and maintenance of optical fiber cable by eliminating the need to handle individual fibers. For example, the splicing and connection of the individual optical fibers in a ribbon is accomplished by splicing and connecting the much larger ribbon.

While the accessing of fibers in groups of twelve is adequate for splicing a large number of fibers at a location, it is also well known in optical fiber network architectures, such as a fiber in the loop (FITL) architecture, that smaller groups of fibers are often dropped off at a node. Traditional ribbon structures do not easily allow for such entry into the ribbon. There also exists the need to access each individual optical fiber within a ribbon for certain ribbon applications.

In cleanly separating twelve (12) individual fibers from a ribbon structure, the goal is to break the bond between the fibers and the encapsulant resin material. It is well known to use tensile forces to remove the matrix material from a ribbon; however, it is also known that due to the thickness and strength of the matrix material, random fractures may occur in the optical fibers, and unsatisfactory matrix material removal may occur due to such tensile forces. It is also known to cut the ribbon with a knife or pin locally to reduce the encapsulant strength and allow for easier separation by tensile loads. However, hazards with this technique include damaging the fiber coating during blade insertion and during propagation of the split with the blade. Tools have been developed to provide improved blade control to minimize the chance of damaging the individual optical fibers; however, damage may still result if tight position control is not achieved and maintained.

Tensile forces along the longitudinal axis of the ribbon can be produced by pulling, peeling or shaving the encapsulant off of the ribbon. Shaving suffers from the same problems associated with using a blade or pin for cutting. Peeling the encapsulant without the use of a blade may be a good solution, particularly in ribbons using encapsulants strong enough to remain in one piece. However, initiating a peel location may be difficult and also pulling on the encapsulant material in the longitudinal axis is difficult while trying to initiate the peel and hold the encapsulant. It is also known to apply shear forces to fatigue the matrix material. However, this method does not always provide satisfactory results. With all of the methods which involve applying a tensile or shear force to a ribbon, damage may result to the individual optical fibers if the bond between the matrixing material and the optical fibers is sufficiently strong that excess force has to be applied to initiate the peeling and removal of the matrix material.

It is also known to use cyanoacrylate ester adhesives to initiate midspan removal of the matrix material because of the strong bond of the cyanoacrylate with the matrix material. It is also known to use adhesive tape to continue matrix material removal initiated by the use of cyanoacrylate.

To make the use of optical fiber ribbon economically viable, midspan access of individual fibers within a ribbon structure must be feasible with a fast, low-risk method. Additionally, the ability to break off or route smaller groups of fibers from the larger group is desirable. The matrix material removal and breaking off of groups of fibers must be able to be performed in a ribbon with live fibers such that all fiber coatings remain structurally intact after the matrix material is removed. It is also important to retain fiber identification through no degradation of the colored ink coatings on individual optical fibers.

SUMMARY OF THE INVENTION

Objects of the invention include the provision of an improved optical fiber ribbon having the ability for easy midspan access of the individual optical fibers within the ribbon without damaging the underlying fibers and such that the underlying fibers remain structurally intact.

Another object of the present invention is to provide an improved optical fiber ribbon where an individual optical fiber or groups of optical fibers may be redirected from the ribbon.

According to the present invention, at least one stress concentration is formed in matrix material surrounding an optical fiber ribbon, the stress concentration extending along at least a portion of the ribbon parallel to the longitudinal axis of the ribbon, the stress concentration concentrating stress applied to the ribbon such that the matrix material easily separates at the stress concentration.

According further to the invention, each stress concentration may be formed after curing of the matrix material by applying an abrasive surface to the optical fiber ribbon at the location of the stress concentration wherein the stress concentration is formed in the matrix material by the abrasive surface.

According still further to the invention, each stress concentration may be formed directly in the matrix material during its application on the optical fibers.

In accordance with a first embodiment of the present invention, stress concentrations are formed on at least one extreme edge of the optical fiber ribbon such that the entire matrix material may be easily removed from a section of optical fiber ribbon at a desired ribbon access location.

In accordance with a second embodiment of the present invention, stress concentrations are formed on at least one of the major surfaces of the optical fiber ribbon at designated locations where it is desired for the optical fiber ribbon to be separated into smaller groups or sub-ribbons.

According still further to the present invention, when stress concentrations are formed on the major surfaces of the optical fiber ribbon, additional matrix material is provided between adjacent optical fibers at the stress concentration location such that when an optical fiber ribbon is separated at the stress concentration location, complete sub-ribbons (sub-groups) are formed.

In further accord with the present invention, means are provided for initiating the removal of the matrix material at the fiber access location, said means including adhesive material such as glue, tape or other suitable adhesive-type surface.

The present invention provides a significant improvement over the prior art by forming stress concentrations into the matrix material of an optical fiber ribbon to thereby facilitate either the removal of matrix material from the optical fiber ribbon or separation of the optical fiber ribbon into sub-ribbons (sub-groups). By forming the stress concentrations in the optical fiber ribbon along the entire length of the optical fiber ribbon, a secure bond is maintained between the matrix material and the ribbon while at the same time the stress concentrations facilitate the removal of the matrix material from a section of the optical fiber ribbon or facilitate the accurate separation of the optical fiber ribbon into sub-ribbons. Therefore, a superior optical fiber ribbon is provided which allows the desired ease of access at midspan locations along the optical fiber ribbon.

The foregoing and other objects, features and advantages of the present invention will become more apparent in light of the following detailed description of exemplary and embodiments thereof, as illustrated in the accompanying drawings.

DETAILED DESCRIPTION OF THE INVENTION

Optical fiber ribbons are well known in the art to include a plurality of individual optical fibers arranged in side-by-side (juxtaposed) relation in a common plane and encapsulated in a matrix material. For example, the individual optical fibers may be single-coated or double-coated optical fibers of any known type. An outer coating of a colorant, such as an acrylate colorant, may be applied to each of the optical fibers to thereby provide a color identification for each of the optical fibers within the ribbon structure. Each of the optical fibers has a small diameter, e.g., 255 to 360 microns, and the matrix material is applied in a generally uniform thin coat to entirely encapsulate all of the optical fibers within the ribbon structure. For example, using one well-known method for forming an optical fiber ribbon, the individual optical fibers are aligned in a common plane and fed through a die in which the matrix material is applied to form the ribbon structure.

One well-known matrix material used for optical fiber ribbons is a polyurethane acrylate resin. Such a resin material may be UV curable, so that after the optical fibers pass through the die and the resin material is applied to form the ribbon matrix over the optical fibers, the entire ribbon structure is passed through a UV light source for curing the resin. It has been found that such a ribbon structure provides for the secure retention of individual optical fibers within the ribbon structure by the resin matrix material and the resin matrix material provides a strong and durable bond with the optical fibers.

Figure 1:
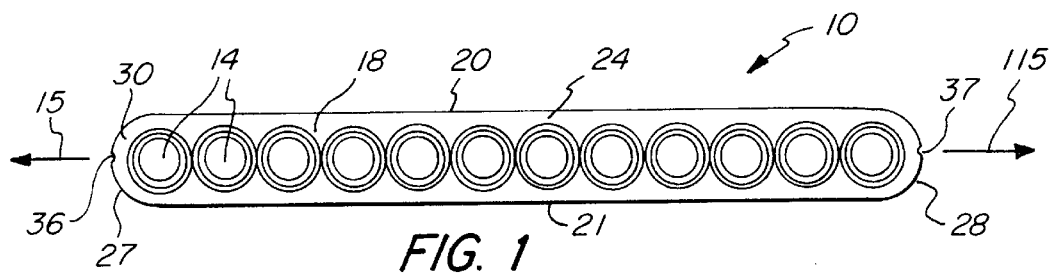
FIG. 1 is a cross-sectional view of an optical fiber ribbon having stress concentrations in accordance with the present invention.

In accordance with the present invention, to facilitate the removal of the resin matrix material from a section of the optical fiber ribbon either at an end of the ribbon or for midspan entry, one or more longitudinally extending stress concentrations are formed in the optical fiber ribbon. Referring to FIG. 1, in accordance with a first embodiment of the present invention, an optical fiber ribbon 10 includes a plurality of optical fibers, e.g., twelve (12) optical fibers 14, arranged next to each other in a common plane 15. Each of the individual optical fibers 14 are arranged side-by-side in the common plane 15 such that the optical fibers are touching adjacent optical fibers or are very closely spaced. Each of the optical fibers has a nominal diameter of between 255 and 260 microns. However, the fiber diameter may vary over a wide range anywhere from 200 to 950 microns.

All of the optical fibers 14 within the plane 15 are encapsulated in a matrix material 18. The matrix material 18 totally coats all of the optical fibers 14 and fills all of the spaces within the optical fiber ribbon 10. At the top and bottom (major surfaces) 20, 21 of the ribbon 10, the matrix material has a thickness 24 preferably in the range of 10 to 30 microns. However, the thickness of the matrix material at the top and bottom may be in the range of between approximately 0 and 400 microns.

At the edges 27, 28 of the ribbon 10, the matrix material has a thickness 30 preferably in the range of 10 to 40 microns. However, the thickness 30 of the matrix material may be in the range of approximately 0 to 150 microns at the edges 27, 28 of the optical fiber ribbons 10.

The matrix material is selected from a group of materials which is strong, elastic, flexible, resistant to heat and other elements, etc. For example, the matrix material may be a UV curable polyurethane acrylate resin manufactured by DSM Desotech Inc, Elgin, Ill., USA, as mentioned above. Alternatively, other commercially available resin materials such as DSM 900 series or BORDEN 100 series may be used as the matrix material, as is well known to those skilled in the art. Additionally, thermoplastic materials such as polyproplyene or TEFLON may be used as the matrix material. As is known to those skilled in the art, once the thermoplastic material is applied as the matrix material in a molten state, it is solidified by the removel of heat.

In order to facilitate the removal of the matrix material 18 from the ribbon 10 at either an end or midspan of the optical fiber ribbon 10, stress concentrations 36, 37 are formed on the edges 27, 28 of the ribbon 10. The stress concentrations 36, 37 include flaws in the otherwise generally smooth surface of the ribbon matrix material, the flaws concentrating any stresses applied to the matrix material 18 to thereby facilitate its separation and subsequent removal from the individual optical fibers 14 which make up the ribbon 10. By concentrating the stresses applied to the optical fiber ribbon, the stress concentrations reduce the amount of stress required for separation of the matrix material and thereby reduce any chance that the optical fiber will be damaged during matrix material removal.

As illustrated in FIG. 1, the stress concentrations 36, 37 are formed on the extreme edges 27, 28 of the ribbon 10 and each stress concentration 36, 37 includes a plurality of indentations or flaws formed in the otherwise smooth surface of the ribbon 10. These stress concentrations 36, 37 are formed in a ribbon 10 along the entire length of the ribbon. Alternatively, the stress concentrations 36, 37 may be formed only in certain sections of the ribbon.

As described above, when tensile and shear forces are applied to the ribbon 10, the stress concentrations 36, 37 concentrate the forces to form areas where the matrix material 18 naturally separates from the optical fibers 14 to facilitate the easy removal of the matrix material 18 from a section of the ribbon 10. To further facilitate removal of the matrix material, a removal agent such as glue or tape may be used. One particularly useful glue for removal of the matrix material is cyanoacrylate. A drop of this glue is applied to a surface (substraight) and the ribbon is placed on the surface with the section of matrix material for removal being placed in contact with the glue drop. After the glue dries, the ribbon is lifted leaving behind a section of the matrix material. The matrix material easily separates at the stress concentrations 36, 37.

The stress concentrations 36, 37 may be formed in the ribbon 10 after the matrix material 18 has been applied to the ribbon and completely cured. For example, after manufacture of the ribbon and curing of the matrix material, e.g., by UV curing or heat treatment, the ribbon is respooled from one spool to another and during the respool, the device of FIG. 2 is used to impart the stress concentrations 36, 37 to the edges of the ribbon 10.

Figure 2:
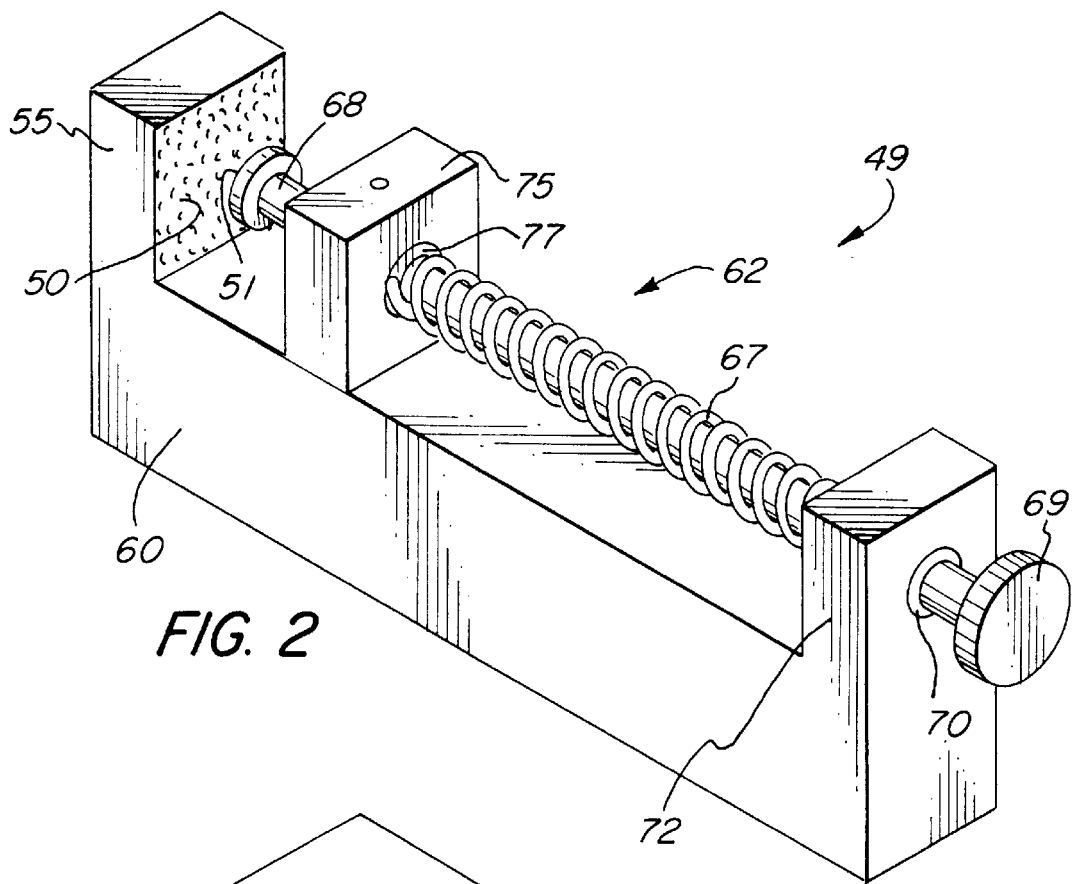
FIG. 2 is a perspective view of a device for forming stress concentrations in the optical fiber ribbon of FIG. 1.

Referring to FIG. 2, the device 49 includes a pair of spaced apart abrasive surfaces 50, 51 between which the optical fiber ribbon 10 is fed. One of the abrasive surfaces 50 is mounted to a vertical surface 55 attached directly to a mounting base 60. The other abrasive surface 51 is mounted on a spring-loaded plunger assembly 62, having a compression spring 67 mounted on a shaft 68. The compression spring 67 controls the compressive forces between the abrasive surfaces 50, 51. The abrasive surface 51, is mounted at an end of the shaft 68. A stopper 69 is mounted on the other end of the shaft 68. The shaft 68 is mounted for sliding movement in a linear bearing 70 supported by a bracket 72. The bracket 72 is integral with, or mounted to, the base 60. The force applied by the compression spring 67 may be adjusted by an adjusting device 75 which controls the compression on the compression spring and therefore the force applied by the abrasive surfaces 50,51 to the ribbon cable. The adjusting device 75 also includes a linear bearing 77 for adjustable movement on the shaft 68.

The abrasive surfaces 50, 51 may include an extremely fine grit sandpaper, e.g., 600 grit sandpaper, to thereby form a rough surface in the matrix material at the stress concentration locations 36, 37 where the ribbon contacts the abrasive surfaces 50, 51. The abrasive surfaces 50, 51 introduce a flaw into the matrix material and allows for the removal of the matrix material. However, the abrasive surfaces 50,51 do not completely penetrate the matrix material to thereby maintain the integrity of the optical fibers at the edges of the ribbon.

Figure 3:
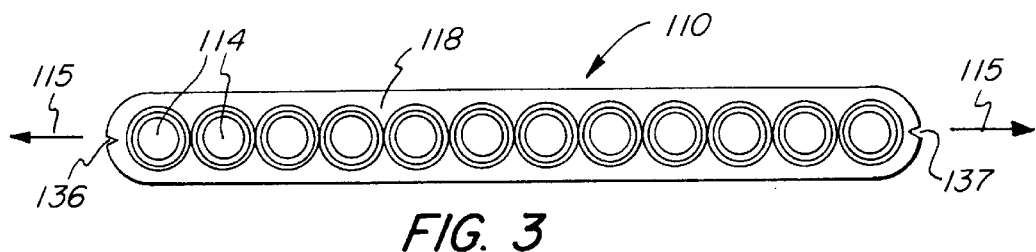
FIG. 3 is a second embodiment of an optical fiber ribbon having stress concentrations in accordance with the present invention.
Figure 4:
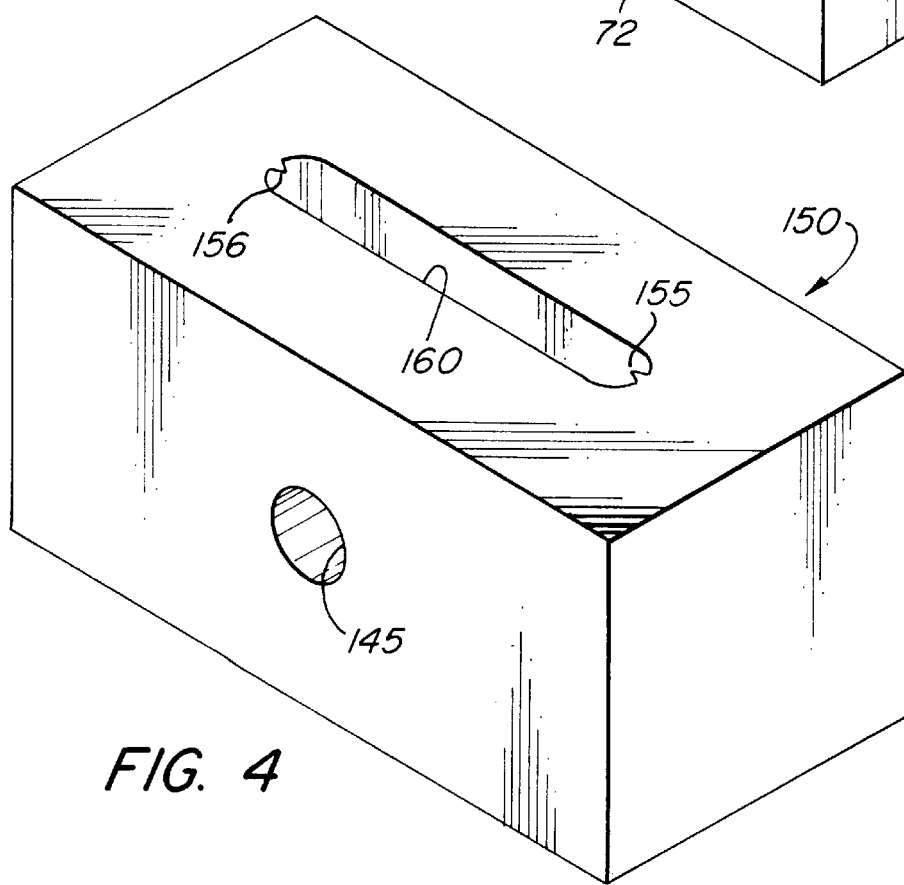
FIG. 4 is a cross-sectional view of an extrusion die used for forming an optical fiber ribbon of FIG. 3.

Referring now to FIG. 3, a second embodiment of the optical fiber ribbon 110 is shown. FIG. 3 is basically identical to FIG. 1 including a plurality of optical fibers 114 in a common plane 115 and encapsulated by a matrix material 118. The difference between the ribbon of FIG. 3 and the ribbon of FIG. 1 is that the stress concentrations 136, 137 are formed directly in the matrix material 118 during extrusion of the matrix material 118 onto the ribbon while passing it through a die (FIG. 4). Referring also to FIG. 4, a die 150 for applying matrix material 118 to an optical fiber ribbon 110 is illustrated. The die 150 is, of the construction well known in the art for having a feed port 145 for receiving the matrix material or applying it to the optical fibers to form the ribbon structure. In order to form the stress concentration of the invention, the die 150 includes an inlet (not shown) where the aligned optical fibers 114 (FIG. 3) are received, and an outlet 160 having a pair of projections 155, 156 which correspond to the stress concentrations 136, 137 of the ribbon 110 (FIG. 3). The projections 155, 156 are formed in the outlet 160 of the die 150 where the coated optical fibers in the ribbon structure exit the die 150. The projections 155, 156 make slight indentations into the matrix material 118 prior to hardening of the matrix material either by cooling, UV curing, heat treatment, etc. The projections 155, 156 are arranged to provide the indentions in the matrix material without damaging the optical fibers at the edges of the ribbon.

Figure 5:
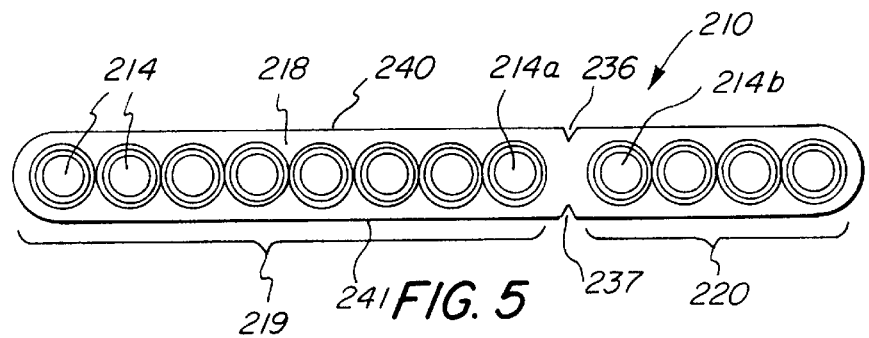
FIG. 5 is a third embodiment of an optical fiber ribbon having stress concentrations on the major surfaces of the optical fiber ribbon.
Figure 6:
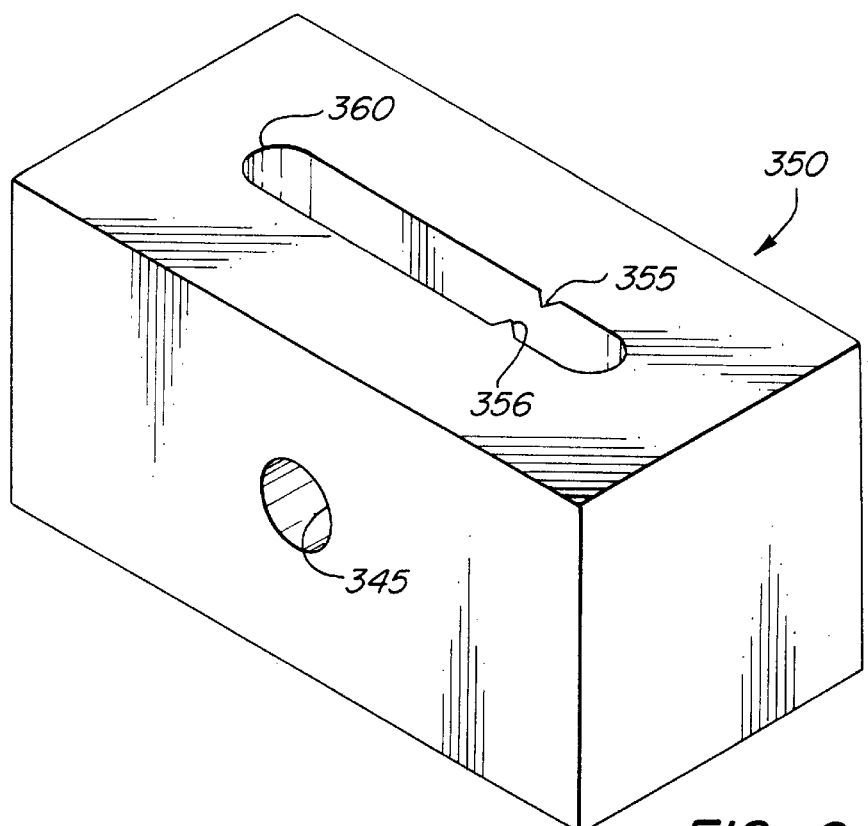
FIG. 6 is a cross-sectional view of an extrusion die for forming the optical fiber ribbon of FIG. 5.

In accordance with a third embodiment of the invention, stress concentrations may be formed in the major surfaces of an optical fiber ribbon in order to facilitate the separation of the optical fiber ribbon into sub-ribbons (sub-groups). Referring to FIG. 5, an optical fiber ribbon 210 includes a plurality of optical fibers 214 encapsulated in a matrix material 218, as described above with respect to FIGS. 1 and 3. However, the optical fibers 214 within the ribbon 210 are separated into sub-ribbons 219 and 220. During formation of the optical fiber ribbon 210, the optical fibers 214 within the sub-ribbons 219, 220 are aligned to pass through a die (FIG. 6) such that a space 226 is provided between the optical fibers 214a, 214b at the edges between the two sub-ribbons 219, 220. Therefore, during extrusion of the matrix material 218 onto the optical fiber ribbon 210 while passing through a die, the space 226 is filled with the matrix material. Thereafter, after passage of the optical fiber ribbon through the die, stress concentrations 236, 237 may be formed in the major surfaces 240, 241 of the ribbon adjacent to the area 226 filled with matrix material.

The stress concentrations 236, 237 may be formed mechanically, using a device such as the device illustrated in FIG. 2, or alternatively the stress concentrations may be formed using a die (FIG. 6) having projections corresponding to the stress concentrations 236, 237. For example, referring to FIG. 6, a die 350 is illustrated which includes a matrix feed port 345 and a pair of projections 355, 356 positioned in the outlet 360 of the die 350. The projection 355,356 form the stress concentrations 236, 237, respectively within the ribbon 210 (FIG. 5) as it passes through the die. Therefore, prior to the curing of the matrix material 218 the stress concentrations are formed longitudinally extending on the major surfaces 240, 241 of the ribbon 210 by the projections 355, 356 in the extrusion die.

Figure 7:
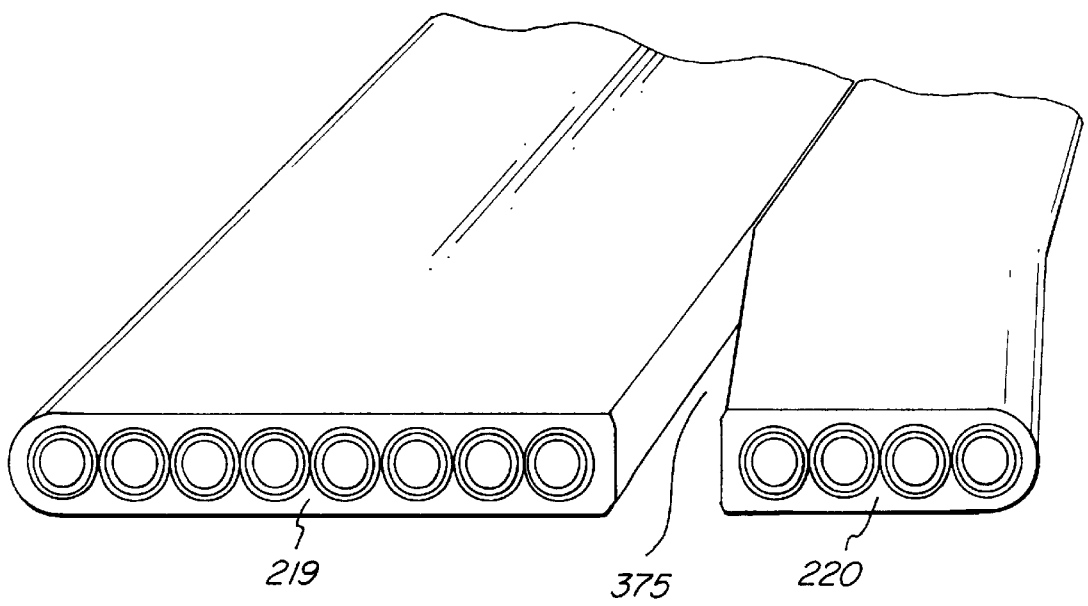
FIG. 7 is a perspective view of the optical fiber ribbon of FIG. 6 separated into two sub-ribbons.

After the matrix material is completely cured, either by cooling, heating or UV curing, the optical fiber ribbon 210 may be divided into two sub-ribbons, with each sub-ribbon including a group 219, 220 of optical fibers. This dividing is accomplished by separating the optical fiber ribbon 210 into two sections at the stress concentration locations 236, 237. By forming the stress concentrations 236, 237 in the longitudinal axis of the ribbon 210, and by providing additional matrix material in the area 226 between the end fibers 214a, 214b of the sub-ribbons 219, 220, additional matrix material remains adjacent to the end optical fibers 214a, 214b and the stress concentrations 236, 237 facilitate a clean break 375 between the subribbons 219, 220 to thereby provide two complete subribbons as illustrated in FIG. 7.

Figure 8:
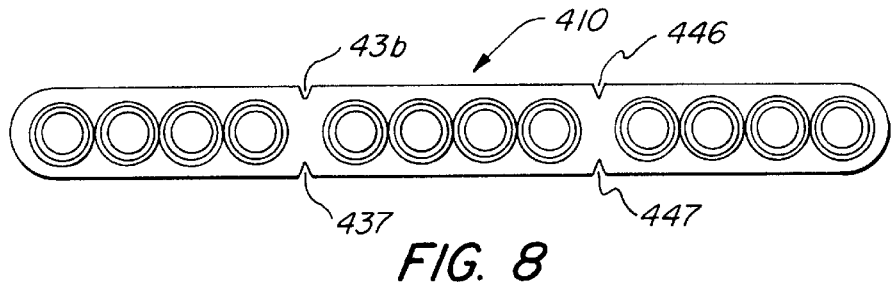
FIG. 8 is a fourth embodiment of an optical fiber ribbon having stress concentrations on the major surfaces thereof.

Although the invention is illustrated in FIG. 5 as including two aligned stress concentrations 236, 237 in the major surfaces 240, 241 of a ribbon 210 dividing the ribbon into two sub-ribbons 219, 220, a plurality of aligned stress concentrations may be formed in a ribbon 410 as illustrated in FIG. 8. For example, if it is desired to break the ribbon 310 into three sub-ribbons, then two pair of aligned stress concentrations 436, 437; 446, 447, respectively, are provided. As will be understood by those skilled in the art, depending on the desired drop off of individual optical fibers from the optical fiber ribbon having n optical fibers, up to n−1 pairs of stress concentrations may be formed in the major surfaces of the optical fiber to thereby drop off n groups of optical fibers from the ribbon. As it will further be understood by those skilled in the art, a group of optical fibers may include one or more optical fibers. Therefore, for example in the optical fiber ribbon of FIGS. 1, 3, 5 and 6, if there are twelve different groups of optical fibers desired for drop off (each optical fiber will be dropped off from the overall ribbon structure), then eleven pairs of stress concentrations may be formed in the ribbon structure, one pair of stress concentrations between each individual optical fiber within the ribbon structure.

Although FIGS. 5 and 8 illustrate a pair of stress concentrations between sub-ribbons, a single stress concentration may be provided on one of the major surfaces between sub-ribbons.

Figure 9:
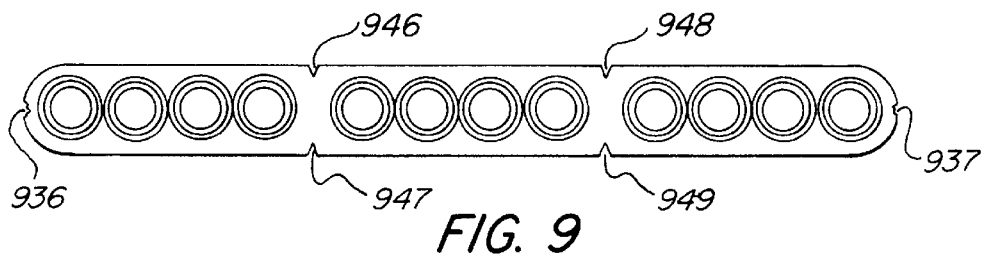
FIG. 9 is a fifth embodiment of an optical fiber ribbon having stress concentrations on both edges and major surfaces thereof.

Referring to FIG. 9, stress concentrations 936,937 may be formed in the edges of an optical fiber ribbon having stress concentrations 946,947,948,949 in its major surfaces. These edge stress concentrations may be formed using the device of FIG. 2, or alternatively, the extrusion die may be provided with projections for both stress concentrations in the major surfaces and the edges of an optical fiber. These edge stress concentrations facilitate the removal of matrix material from the sub-ribbons.

The invention has been described herein with respect to an optical fiber ribbon having a single coating layer of matrix material. However, the invention will work equally well with an optical fiber ribbon having multiple layers of matrix material. For example, it is know to form a ribbon with a very light (thin) layer of matrix material for improved geometry control. Thereafter, a secondary layer of matrix material may be added. The stress concentrations of the present invention may be formed in the secondary layer of matrix material in the way described hereinabove.

Although the invention has been described and illustrated with respect to exemplary embodiments thereof, the foregoing and various other additions and omissions may be made therein and thereto without departing from the spirit and scope of the present invention.

We claim:

1. An extrusion die for applying a matrix material to a plurality of optical fibers to thereby form an optical fiber ribbon, comprising:

a throughgoing aperture formed in said extrusion die having an inlet for receiving a plurality of optical fibers positioned in a common plane in side-by-side relation to one another, and an outlet wherein said optical fiber ribbon exits the extrusion die;

means for receiving uncured UV molten matrix material and for applying said uncured matrix material to the optical fibers within said aperture; and at least one projection formed in said outlet of the extrusion die, said at least one projection forming at least one indentation in the surface of said uncured matrix material.

2. An extrusion die as claimed in claim 1 wherein the optical fiber ribbon includes a pair of opposed major surfaces and wherein said at least one indentation is formed in one of said major surfaces of said optical fiber ribbon.

3. An extrusion die as claimed in claim 2, wherein said optical fibers are received in said inlet with a space between two adjacent optical fibers of said plurality of optical fibers adjacent to said indentation, and wherein additional matrix material is received in said space.

4. An extrusion die as claimed in claim 1, wherein said at least one indentation is formed in an extreme edge of said optical fiber ribbon.

5. Apparatus for scoring a surface of an optical fiber ribbon, the optical fiber ribbon including a plurality of optical fibers arranged in side-by-side relationship in a common plane and a layer of matrix material encapsulating the plurality of optical fibers, the apparatus comprising:

at least one abrasive surface; and spooling means for passing the optical fiber ribbon past said at least one abrasive surface with at least a portion of the surface of said optical fiber ribbon contacting said at least one abrasive surface;

wherein a longitudinally extending score is formed in said at least one portion of the surface of said optical fiber ribbon, a depth of said score being less than a thickness of said matrix material.

6. Apparatus according to claim 5, further comprising:

a second abrasive surface facing said at least one abrasive surface and positioned in spaced relationship to said at least one abrasive surface;

wherein said spooling means passes said optical fiber ribbon past said second abrasive surface with at least a second portion of the surface of said optical fiber ribbon contacting said second abrasive surface; and wherein a second longitudinally extending score is formed in said second portion of the surface of said optical fiber ribbon, a depth of said second longitudinally extending score being less than the thickness of said matrix material.

7. Apparatus according to claim 6, further comprising means for applying a spring force between said at least one and said second abrasive surfaces.

* * * * *